United States Patent
Brown

(10) Patent No.: US 9,385,442 B2
(45) Date of Patent: Jul. 5, 2016

(54) INTEGRAL GROUNDING HUB

(71) Applicant: Michael Charles Brown, Warners, NY (US)

(72) Inventor: Michael Charles Brown, Warners, NY (US)

(73) Assignee: Cooper Technologies Company, Houston, TX (US)

(*) Notice: Subject to any disclaimer, the term of this patent is extended or adjusted under 35 U.S.C. 154(b) by 115 days.

(21) Appl. No.: 14/283,003

(22) Filed: May 20, 2014

(65) Prior Publication Data
US 2015/0340776 A1 Nov. 26, 2015

(51) Int. Cl.
| | |
|---|---|
| *H01R 4/66* | (2006.01) |
| *H01R 4/36* | (2006.01) |
| *H01R 13/648* | (2006.01) |
| *H01R 4/34* | (2006.01) |
| *H02G 3/22* | (2006.01) |
| *H01R 4/64* | (2006.01) |

(52) U.S. Cl.
CPC .. *H01R 4/36* (2013.01); *H01R 4/34* (2013.01); *H01R 4/66* (2013.01); *H01R 13/648* (2013.01); *H02G 3/22* (2013.01); *H01R 4/64* (2013.01); *Y10T 29/49004* (2015.01)

(58) Field of Classification Search
USPC ........................................................ 439/100
See application file for complete search history.

(56) References Cited

U.S. PATENT DOCUMENTS

| | | | |
|---|---|---|---|
| 1,486,560 A | 3/1924 | Becker | |
| 3,643,203 A | 2/1972 | McLaughlin et al. | |
| 3,967,872 A | 7/1976 | Mooney et al. | |
| 4,159,859 A | 7/1979 | Shemtov | |
| 4,248,490 A | 2/1981 | Bachle | |
| 4,806,108 A | 2/1989 | Meinhardt | |
| 5,929,383 A * | 7/1999 | Marik .................. | H01R 13/648 174/78 |
| 6,241,563 B1 | 6/2001 | Warner et al. | |
| 7,165,980 B2 * | 1/2007 | Pyron .................... | H01R 4/643 439/100 |
| 7,182,611 B2 | 2/2007 | Borden et al. | |
| 7,281,932 B2 * | 10/2007 | Cheng .................. | H02G 3/0616 439/100 |
| 8,106,297 B1 | 1/2012 | Kiely | |
| 8,299,362 B2 * | 10/2012 | Vaughan .............. | H02G 3/0683 174/50 |
| 8,512,052 B2 | 8/2013 | Garvin | |
| 8,979,557 B2 * | 3/2015 | Dinh .................... | H02G 3/0691 174/78 |

* cited by examiner

*Primary Examiner* — Tho D Ta
(74) *Attorney, Agent, or Firm* — King & Spalding LLP

(57) ABSTRACT

The present disclosure provides systems and techniques for an improved grounding hub installation experience. The apparatus disclosure herein provides a plurality of quick access coupling points for connecting an integral grounding hub to a ground wire. Specifically, the disclosed apparatus includes one or more bosses having a top screw hole and a side screw hole and one or more recessed channels next to the screw holes. A ground wire can be received in the recessed channels and secured by a screw received in the respective screw hole. Additionally, some example embodiments include a through-hole formed beneath and orthogonal to the screw holes. The through-hole can receive a ground wire therethrough, which is pinned down by a screw received in the respective screw hole.

26 Claims, 5 Drawing Sheets

INTEGRAL GROUNDING HUB

TECHNICAL FIELD

The present disclosure relates generally to wire coupling devices and terminals. Specifically, the present disclosure relates to an integral wire coupling apparatus for terminating a wire and providing an integrated connection therewith.

BACKGROUND

Electronic wires and other connections often need to be routed from one location to another location. Often, several such wires are routed together through a conduit coupled to both locations. The conduit is often coupled to a wall or enclosure in which the internal wires are to be coupled to devices on the other side of the wall or enclosure. Thus, a hole is made in the wall or enclosure to accommodate entrance of the wires. Generally, the conduit is securely coupled to the wall or enclosure by a terminal hub, which also forms a weatherproof seal between the conduit and the wall or enclosure. Thus, the internal wires are routed to the inside of the wall or enclosure without being exposed to the elements. Terminal hubs provide a termination or connection point for wires for various function. In one example, the terminal hub is conductively coupled to a grounding connection in order to provide a passage to ground. In such an example, after the grounding hub is installed into the wall or enclosure and coupled to the conduit, the grounding hub is conductively coupled to a grounding connection from within the wall or enclosure. However, depending on how the grounding hub is positioned with respect to the enclosure and other components, and depending on how the grounding connection is configured, it may be difficult or unwieldy for an operator to make a secure connection between the ground wire and the grounding hub.

SUMMARY

In an example embodiment of the present disclosure, an integral wire coupling apparatus includes a coupling nut having a top surface, a bottom surface, an exterior surface, and an interior surface, in which the interior surface defines an opening through the coupling nut. The integral wire coupling apparatus also includes a boss having at least one of a top portion and a side portion. The top portion is formed on a portion of the top surface of the coupling nut, and the side portion is formed on a portion of the exterior surface adjacent to the portion of the top surface. Each of the top portion and side portion of the boss includes a first recessed channel and a screw hole formed next to the first recessed channel. The integral wire coupling apparatus further includes a hub body removably coupled to the coupling nut. The hub body includes an inner portion and an outer portion, in which the inner portion is configured to couple with the coupling nut.

In another example embodiment of the present disclosure, an integral wire coupling apparatus includes a coupling nut having a top surface, a bottom surface, an exterior surface, and an interior surface, in which the interior surface defines an opening through the coupling nut. A through-hole is formed within the coupling nut and extends from a first portion of the exterior surface to a second portion of the exterior surface. A first coupling aperture is formed in the coupling nut and extends from one of a portion of the top surface of the coupling nut or a portion of the exterior surface of the coupling nut to the through-hole. The integral wire coupling apparatus also includes a hub body removably coupled to the coupling nut.

In another example embodiment of the present disclosure, an integral coupling nut includes a top surface, a bottom surface, an exterior surface, and an interior surface, in which the interior surface defines an opening through the coupling nut. A through-hole is formed within the coupling nut and extends from a first portion of the exterior surface to a second portion of the exterior surface without traversing the interior surface. A first screw hole is formed in the coupling nut and extends from one of a portion of the top surface of the coupling nut or a portion of the exterior surface of the coupling nut to the through-hole. A first recessed channel is formed next to the first screw hole on the portion of the top surface or the portion of the exterior surface.

BRIEF DESCRIPTION OF THE DRAWINGS

For a more complete understanding of the disclosure and the advantages thereof, reference is now made to the following description, in conjunction with the accompanying figures briefly described as follows.

Figure 1:
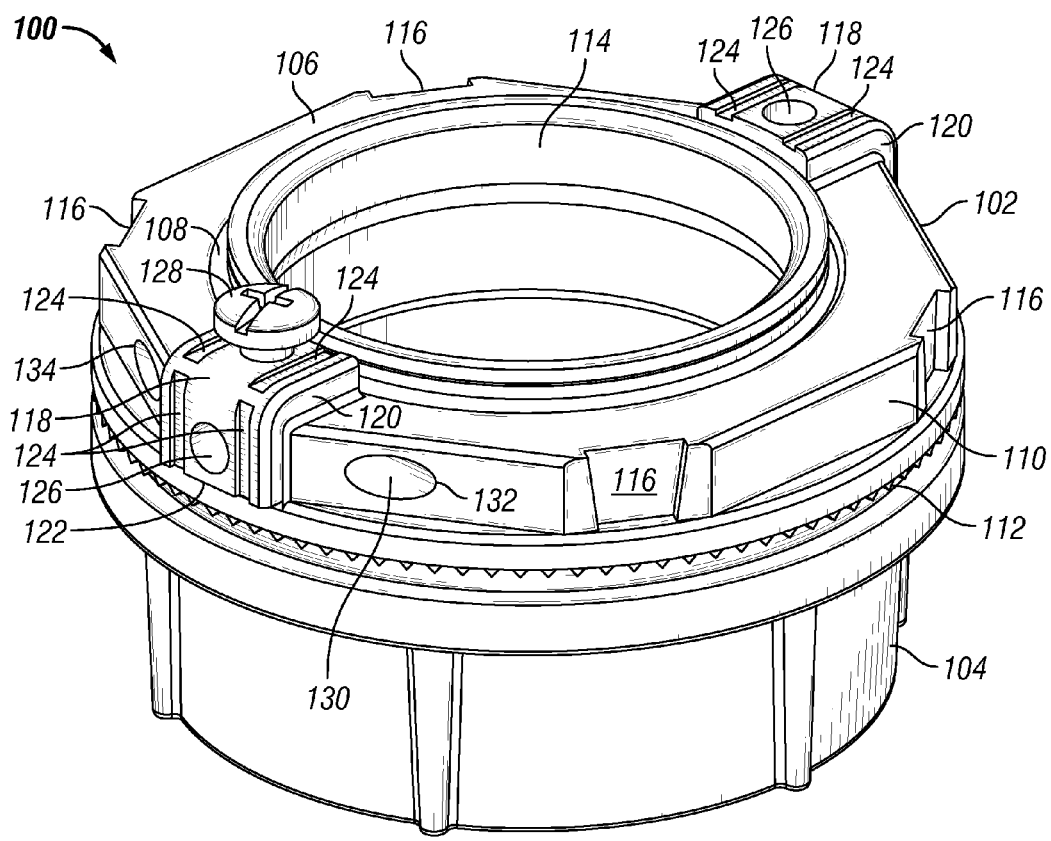
FIG. 1 illustrates a perspective view of an integral grounding hub, in accordance with an example embodiment of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

The present disclosure provides an integral wire coupling apparatus configured to receive and couple to a wire, such as a grounding wire, communication wire, sensor wire, and the like. The present disclosure describes in detail an integral grounding hub as an illustrative example of the integral wire coupling apparatus. The integral grounding hub provides a connection between a conduit and an enclosure as well as for coupling to a grounding wire. Specifically, the integral ground hub provides a plurality of quick access coupling points for coupling to a ground wire, thereby providing an improved installation experience. The term "grounding hub" is used generally to refer to an apparatus of the type disclosed herein, which can also be known as a "grounding terminal", "grounding location", and the like. However, the techniques, methods, and structures disclosed herein are applicable to embodiments and uses of the integral wire coupling apparatus other than for grounding wires, such as communication wires, sensors wires, power wires, and wiring having other functions.

Figure 2:
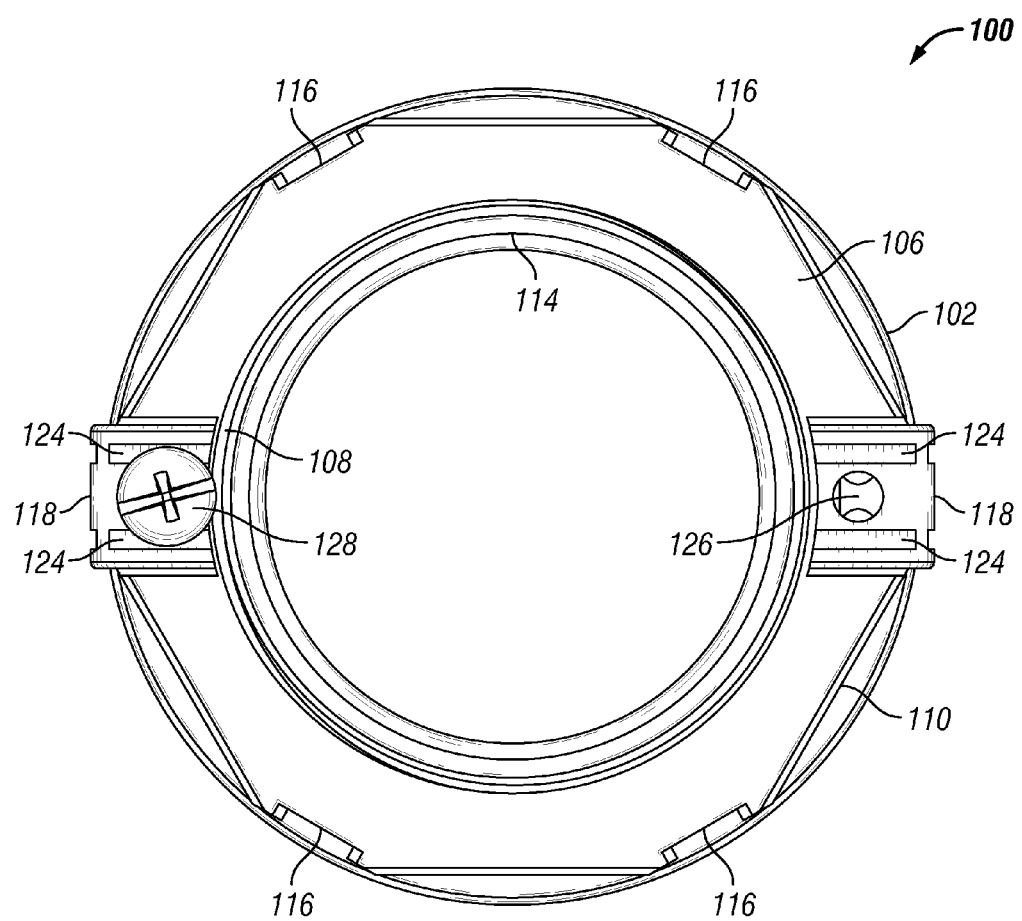
FIG. 2 illustrates a top view of the integral grounding hub of FIG. 1, in accordance with an example embodiment of the present disclosure.
Figure 3:
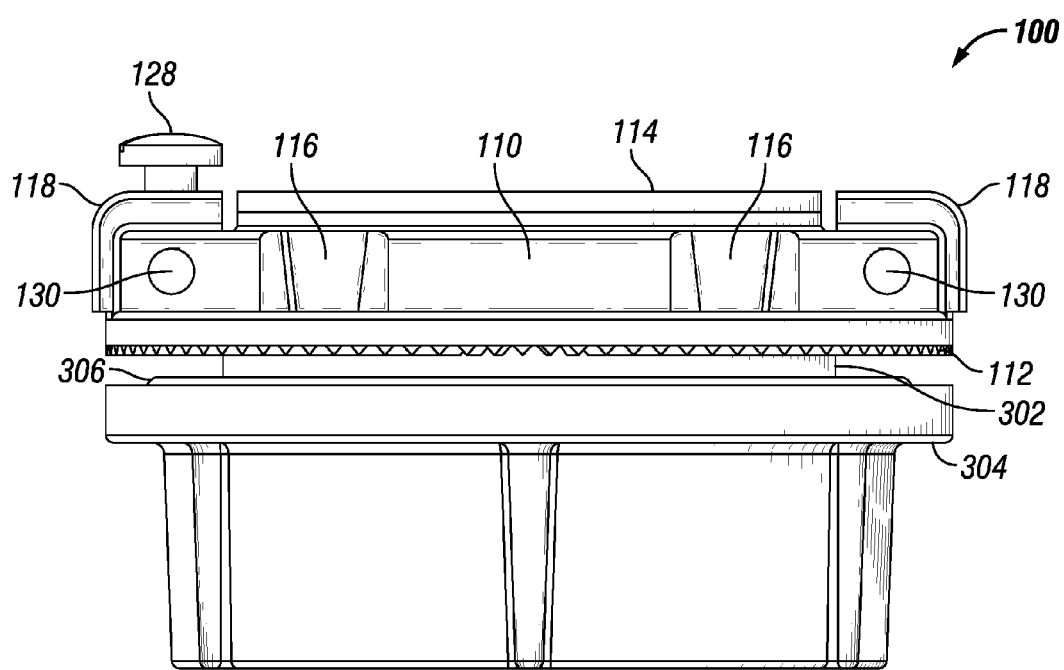
FIG. 3 illustrates a side view of the integral grounding hub of FIG. 1, in accordance with an example embodiment of the present disclosure.

FIG. 1 illustrates a perspective view of an integral grounding hub 100, FIG. 2 illustrates a top view of the integral grounding hub 100, and FIG. 3 illustrates a side view of the integral ground hub, in accordance with example embodiments of the present disclosure. The integral grounding hub 100 includes a grounding nut 102 and a hub body 104. The grounding nut 102 includes a top surface 106, a bottom surface 112, an exterior surface 110, and an interior surface 108. The interior surface 108 defines an opening through the grounding nut 102. In certain example embodiments, the opening is a circular opening. In certain example embodiments, the interior surface 108 is lined with a throat liner 114. The throat liner 114 protects the wiring passing through the grounding hub 100, for example, from rubbing against internal edges of the grounding hub 100. The throat liner also eases the installation process by creating a low friction surface for conductor jackets to slide against. In certain example embodiments, the exterior surface 110 includes a plurality of straight surfaces and a plurality of recessed surfaces 116. In certain example embodiments, the recessed surfaces 116 are configured to receive a tool, such as a screwdriver, used to urge or tighten the grounding nut 102 onto the hub body 104. In certain other example embodiments, the exterior surface 110 is made up of a plurality of straight surfaces. In certain example embodiments, the exterior surface 110 is substantially round.

In certain example embodiments, the grounding nut 102 further comprises at least one boss 118 disposed or formed on a portion of the top surface 106 of the grounding nut 102 and an adjacent portion of the exterior surface 110. Specifically, in certain example embodiments, the boss 118 includes a top portion 120 disposed on the top surface 106 of the grounding nut 102 and a side portion 122 disposed on the exterior surface 110 of the grounding nut 102. In certain example embodiments, the top portion 120 and the side portion 122 are adjacent and integral. In certain example embodiments, each of the top portion 120 and the side portion 122 of the boss 118 has one or more recessed channels 124 formed therein. Each of the top portion 120 and the side portion 122 of the boss 118 also has a screw hole formed therein extending from a surface of the boss 118 to a certain depth within the grounding nut 102. In certain example embodiments, the screw hole 126 is threaded and configured to receive a screw therein. In certain example embodiments, and as illustrated in FIG. 1, the screw hole 126 is formed between two recessed channels 124. In such example embodiments, a stripped portion of a grounding wire is placed within one of the two recessed channels 124, looped around, and placed in the other of the two recessed channels 124. A screw 128 is tightened into the screw hole 126 such that the head of the screw 128 is tightened over the two recessed channels 124, thereby holding the grounding wire tightly within the recessed channels 124. Thus, the grounding nut 102 is electrically and securely coupled to the grounding wire, which provides a path to ground for the grounding hub 100. In alternate embodiments, there may only be a single recessed channel located next to the screw hole 126.

In certain example embodiments the boss 118 is formed integrally with the grounding nut 102. In certain other example embodiments, the boss 118 is formed separately from the grounding nut 102 and then attached to the grounding nut 102. In certain example embodiments, the grounding nut 102 does not include a raised boss 118 as shown in the figures. Rather, in such embodiments, the recessed channels 124 and screw holes 126 are formed directly in the top and exterior surfaces of the grounding nut, respectively. In certain example embodiments, a clamping device such as a saddle clamp, washer, or the like is disposed between the screw head and the grounding wire such that the clamping device is in direct contact with the grounding wire rather than the screw head being in direct contact with grounding wire. In certain example embodiments, the screw hole 126 is replaced with an alternative fastening element or aperture configured to secure the grounding wire to the grounding nut 102. For example, in certain embodiments, the grounding hub 102 includes a "push-in" connection point. The "push-in" connection point includes spring loaded clips which allow a wire to be pushed in in one direction, but not to be pulled out in the opposite direction. In another example embodiment, the grounding hub 102 includes a securement bar which is attached to the grounding nut at one end via a hinge and attached to the grounding nut by a releasable fastener at the other end, with the grounding wire secured between the grounding nut and the securement bar when the securement bar is fastened.

In certain example embodiments, the grounding nut 102 further includes a through-hole 130 formed within the grounding nut 102. In certain example embodiments, the through-hole 130 extends from a first portion 132 of the exterior surface 110 to a second portion 134 of the exterior surface 110 without traversing the interior surface 108. In certain example embodiments, the screw hole 126 extends from a surface of the boss 118 until it traverses or is in communication with the through-hole 130. Thus, a stripped portion of a grounding wire can be placed within the through-hole 130 and secured onto the grounding nut 102 when the screw 128 is tightened into the screw hole 126. Specifically, the shaft of the screw 128 pins the grounding wire against a side of the through-hole. In some example embodiments, the through-hole 130 is curved. In other example embodiments, the through-hole is straight. In certain example embodiments, the through-hole 130 begins at a first portion of the exterior surface and terminates within the ground nut 102 instead of extending through to a second portion of the exterior surface. In one such example embodiment, the through-hole 130 curves around within the grounding nut 102.

Referring to the example embodiment of the grounding hub 100 illustrated in FIGS. 1-3, the grounding nut 102 can be coupled to a grounding wire in a plurality of different ways, improving ease of installation. In one example embodiment, the grounding wire can be disposed within one or both recessed channels 124 on the top portion 120 of the boss 118 in any direction, and secured by a screw 128 threaded into the screw hole 126 formed in the top portion 120 of the boss. In another example embodiment, the grounding wire can be disposed within recessed channels 124 on the side portion 122 of the boss 118 in any direction, and secured by a screw 128 threaded into the screw hole 126 formed in the top portion 122 of the boss. In another example embodiment, the grounding wire can be threaded through the through-hole 130 in either direction and secured by tightening a screw 128 into either the screw hole 126 formed in the top portion 120 of the boss 118 or the screw hole 126 in the side portion 122 of the boss 118.

In certain example embodiments, the grounding nut 100 includes a plurality of bosses 118 formed at different positions on the grounding nut 102. The illustrated example embodiment includes two bosses 118, each having the recessed channels 124 and screw holes 126 described above. Accordingly, the same embodiment also includes two through-holes 130, each formed beneath a respective boss 118 and configured as described above. In certain example embodiments, the grounding nut 102 includes a boss 118 in which there is not a through-hole 130 running through the grounding nut 102 below the boss 118 such that the grounding wire must be fastened by the screw 128 to either the top portion 120 or the side portion 122 of the boss 118. In certain example embodiments, the ground wire can be secured to a saddle clamp or other type of clamp fastened to the boss 118 by the screw 128. In certain example embodiments, the boss 100 does not include the recessed channels 124. In certain example embodiments, the grounding nut 102 includes a screw hole 126 formed directly in the top surface 106 and extending into a through-hole 130 formed in the grounding nut 102. In certain example embodiments, the grounding nut 102 includes a screw hole 126 formed directly in the exterior surface 110 and extending into a through-hole 130 formed in the grounding nut 102.

Figure 5:
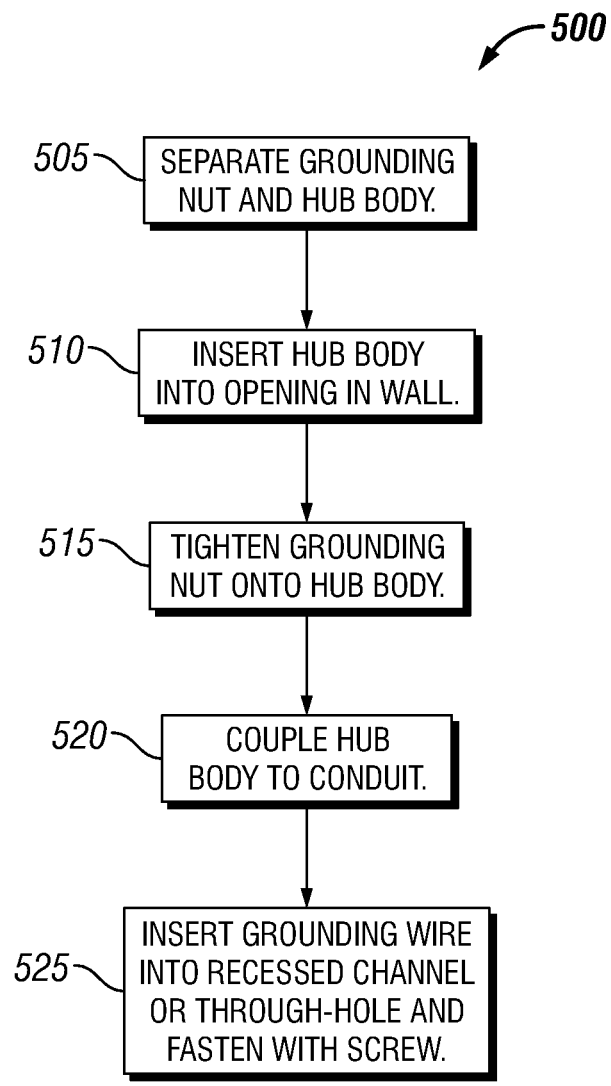
FIG. 5 illustrates a method of fitting a grounding hub onto a wall of an enclosure, in accordance with an example embodiment of the present disclosure.

In certain example applications, the grounding hub 100 is fitted onto a wall of an enclosure, and provides a waterproof seal therebetween. An example method 500 for fitting a grounding hub 100 onto a wall of an enclosure is illustrated in FIG. 5. It should be understood that the steps illustrated in FIG. 5 are merely an example and in alternate embodiments certain steps may be added, removed or performed in a different order.

Referring to method 500, in step 505 the grounding nut 102 is separated from the hub body 104 before installation. In certain example embodiments, the hub body 104 includes an inner portion 302, as best seen in FIG. 3 and an outer portion 304. In step 510, the inner portion 302 is inserted through a similarly sized opening in the wall of the enclosure. The opening in the wall is generally smaller than the outer portion 304 of the hub body 104 such that the outer portion 304 cannot go through the opening and is on the outside of the enclosure. In step 515, the grounding nut 102 is tightened onto the inner portion 302 from inside the enclosure, or a side of the wall opposite the outer portion 304 of the hub body 104. The grounding nut 102 and the hub body 104 are thus tightened against the wall of the enclosure and securely disposed within the enclosure. In step 520, the end of the hub body 104 opposite the grounding nut 102 is coupled to a conduit. In step 525, the grounding nut is coupled to a grounding wire via one of the techniques disclosed above. For example, a grounding wire can be inserted into one of the recessed channels 124 and screw 128 can be tightened onto the grounding wire. Alternatively, a grounding wire can be inserted into through-hole 130 and the screw 128 can be tightened fastening the grounding wire against one of the interior walls of through-hole 130.

In certain example embodiments, the outer portion 304 of the hub body 104 includes a seal 306 which provides a weatherproof seal between the enclosure and the grounding hub 100. In certain example embodiments, the outer portion 304 of the hub body 104 also includes a serrated surface facing the grounding nut 102 which provides increased friction against the wall of the enclosure. In certain example embodiments, the bottom surface 112 of the grounding nut 102 includes a serrated surface.

Figure 4:
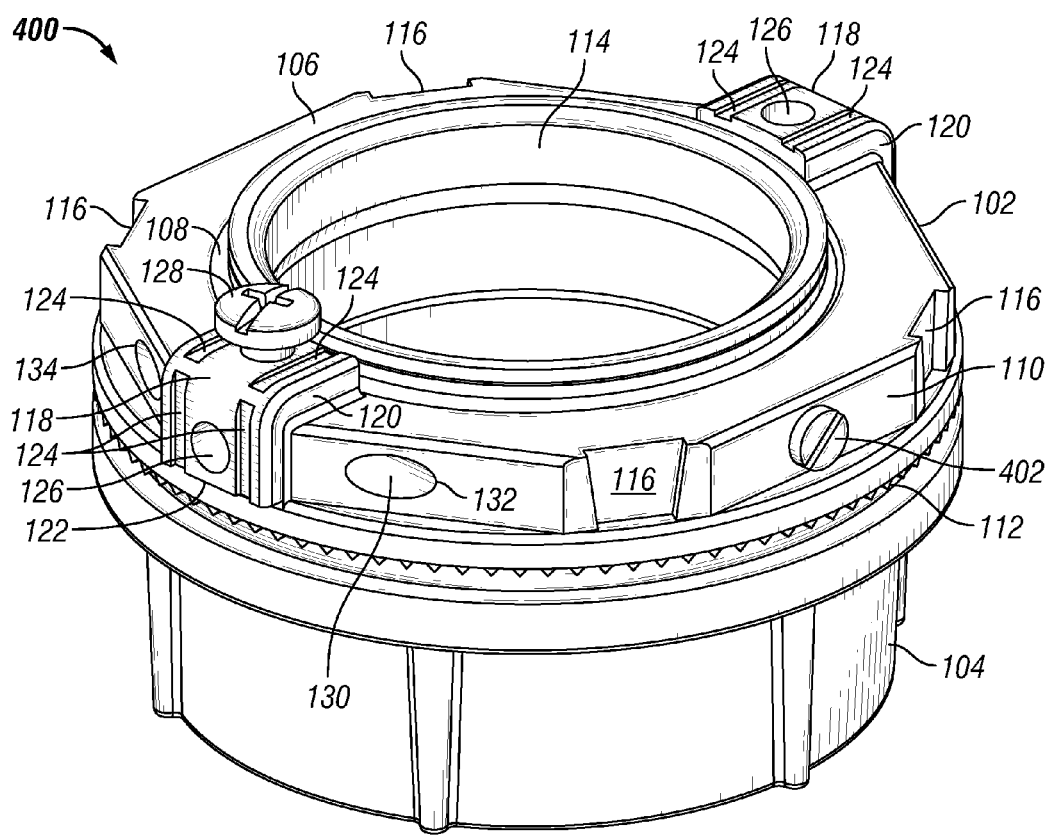
FIG. 4 illustrates a perspective view of another embodiment of an integral grounding hub, in accordance with an example embodiment of the present disclosure.

FIG. 4 illustrates another embodiment of a grounding hub 400, in accordance with example embodiments of the present disclosure. In certain example embodiments, the grounding hub includes a grounding nut 102 and a hub body 104 similar to that discussed with reference to FIGS. 1-3. In certain example embodiments, the grounding nut 102 of the grounding hub 400 further includes a set screw 402. When the grounding hub 400 is installed onto an enclosure and the grounding hub 400 is urged onto the hub body 104, the set screw 402 is tightened to secure the grounding nut 102 to the hub body 104. In certain example embodiments, alternatives to the set screw 402 can be used to secure the grounding nut 102 to the hub body 104 such as, but not limited to, a pin, a clip, a latch, and the like. In certain example embodiments, the grounding nut 102 includes a plurality of set screws 104 disposed at equal or varying intervals around the grounding nut. Accordingly, the grounding nut 102 includes one or more screw holes (not shown) for receiving the set screw 402.

Although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. An integral wire coupling apparatus, comprising:
   a coupling nut comprising a top surface, a bottom surface, an exterior surface, and an interior surface, wherein the interior surface defines an opening through the coupling nut;
   a boss comprising at least one of a top portion and a side portion, wherein the top portion is formed on a portion of the top surface of the coupling nut, and the side portion is formed on a portion of the exterior surface adjacent to the portion of the top surface, wherein each of the top portion and side portion of the boss comprises a first recessed channel, and a screw hole formed next to the first recessed channel; and
   a hub body removably coupled to the coupling nut, the hub body comprising an inner portion and an outer portion, the inner portion configured to couple with the coupling nut.

2. The integral wire coupling apparatus of claim 1, wherein the at least one boss comprises a first boss and a second boss disposed at opposite portions of the coupling nut.

3. The integral wire coupling apparatus of claim 1, wherein a through-hole is formed within the coupling nut and extends from a first portion of the exterior surface to a second portion of the exterior surface without traversing the interior surface; and
   wherein the first screw hole extends from the boss to the through-hole.

4. The integral wire coupling apparatus of claim 1, wherein the boss comprises both the top portion and the side portion, and wherein the top portion and the side portion are coupled and continuous.

5. The integral wire coupling apparatus of claim 1, wherein the coupling nut comprises a set screw disposed along the exterior surface, the set screw securing the coupling nut to the hub body.

6. The integral wire coupling apparatus of claim 1, wherein at least one of the bottom surface of the coupling nut or a top surface of the outer portion of the hub body includes a serrated surface.

7. The integral wire coupling apparatus of claim 1, wherein each of the top portion and side portion of the boss further comprises a second recessed channel formed next to the screw hole opposite the first recessed channel.

8. An integral wire coupling apparatus, comprising:
a coupling nut comprising a top surface, a bottom surface, an exterior surface, and an interior surface, wherein the interior surface defines an opening through the coupling nut;
wherein a through-hole is formed within the coupling nut and extends from a first portion of the exterior surface to a second portion of the exterior surface;
wherein a first screw hole is formed in the coupling nut and extends from one of a portion of the top surface of the coupling nut or a portion of the exterior surface of the coupling nut to the through-hole, and
a hub body removably coupled to the coupling nut.

9. The integral wire coupling apparatus of claim 8, wherein a second through-hole is formed within the coupling nut and extends from a third portion of the exterior surface to a fourth portion of the exterior surface without traversing the interior surface.

10. The integral wire coupling apparatus of claim 8, wherein the first screw hole is substantially orthogonal to the through-hole.

11. The integral wire coupling apparatus of claim 8, wherein the through-hole is configured to receive a wire therethrough and the first screw hole is configured to receive a screw, wherein when the screw is screwed in, the screw pins the wire against a wall of the through-hole.

12. The integral wire coupling apparatus of claim 8, wherein a second screw hole is formed in the coupling nut and extends from the other of the portion of the top surface of the coupling nut or the portion of the exterior surface of the coupling nut to the through hole, and wherein both the first screw hole and the second screw hold are substantially orthogonal to the through-hole.

13. The integral wire coupling apparatus of claim 8,
wherein the coupling nut comprises a set screw disposed into the coupling nut from the exterior surface, the set screw securing the coupling nut to the hub body; and
wherein at least one of the bottom surface of the coupling nut or a top surface of the outer portion of the hub body includes a serrated surface.

14. An integral coupling nut, comprising:
a top surface, a bottom surface, an exterior surface, and an interior surface, wherein the interior surface defines an opening through the coupling nut;
wherein a through-hole is formed within the coupling nut and extends from a first portion of the exterior surface to a second portion of the exterior surface without traversing the interior surface;
wherein a first coupling aperture is formed in the coupling nut and extends from one of a portion of the top surface of the coupling nut or a portion of the exterior surface of the coupling nut to the through-hole; and
a first recessed channel formed next to the first coupling aperture on the portion of the top surface or the portion of the exterior surface.

15. The integral coupling nut of claim 14, wherein the first coupling aperture is a first screw hole.

16. The integral coupling nut of claim 14, wherein the first coupling aperture is a push-in wire retention device or a hinged securement bar.

17. The integral coupling nut of claim 15, further comprising:
a second recessed channel formed next to the first screw hole opposite the first recessed channel.

18. The integral coupling nut of claim 14, wherein the portion of the top surface and the portion of the exterior surface are raised relative to the remainder of the top surface and exterior surface, forming a boss.

19. The integral coupling nut of claim 15, wherein the recessed channel is configured to receive a wire and the first screw hole is configured to receive a screw, wherein a head of the screw secures the wire within the recessed channel.

20. The integral coupling nut of claim 15, wherein a second screw hole is formed in the coupling nut and extends from the other of the portion of the top surface of the coupling nut or the portion of the exterior surface of the coupling nut to the through-hole, and wherein both the first screw hole and the second screw hold are substantially orthogonal to the through-hole.

21. The integral coupling nut of claim 15, wherein the through-hole is configured to receive a wire therethrough and the first screw hole is configured to receive a screw, wherein when the screw is screwed in, the screw pins the wire against a wall of the through-hole.

22. The integral coupling nut of claim 14, wherein the through hole is configured to receive a wire entering through the first portion of the exterior surface or a second portion of the exterior surface.

23. The integral coupling nut of claim 19, further comprising an intermediate clamping device disposed between a screwhead of the screw and the recessed channels, wherein the screw secures the wire within the recessed channel via the intermediate clamping device.

24. A method of installing an integral wire coupling apparatus comprising the steps of:
inserting a hub body into an aperture in a wall;
tightening a coupling nut onto the hub body;
inserting a wire into a through-hole, the through-hole extending from an exterior surface of the coupling nut to a screw hole in the coupling nut;
inserting a screw into the screw hole so that the screw is in contact with the wire and secures the wire against an inner surface of the through-hole; and
tightening a set screw disposed along the exterior surface of the coupling nut, the tightening of the set screw fastening the coupling nut to the hub body.

25. A method of installing an integral wire coupling apparatus comprising the steps of:
tightening a coupling nut onto a hub body on an aperture wall;
placing a wire in a recessed channel, the recessed channel disposed on an exterior surface of the coupling nut and disposed proximate to a screw hole; and
inserting a screw into the screw hole such that a screw head of the screw is in contact with the wire and secures the wire to the exterior surface of the coupling nut;
wherein the step of placing a wire in a recessed channel further comprises bending the wire so that it is placed in a plurality of recessed channels.

26. The method of claim 25, further comprising the step of tightening a set screw disposed along the exterior surface of the coupling nut, the tightening of the set screw fastening the coupling nut to the hub body.

* * * * *